US006898943B2

United States Patent
Tanaka (10) Patent No.: US 6,898,943 B2
(45) Date of Patent: May 31, 2005

(54) METHOD OF CONTROLLING TEMPERATURE/HUMIDITY OR TEMPERATURE AND DEVICE FOR CONTROLLING TEMPERATURE/HUMIDITY OR TEMPERATURE

(75) Inventor: Masato Tanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 14 days.

(21) Appl. No.: 10/343,689

(22) PCT Filed: Aug. 6, 2001

(86) PCT No.: PCT/JP01/06732
§ 371 (c)(1),
(2), (4) Date: Jun. 23, 2003

(87) PCT Pub. No.: WO02/12798
PCT Pub. Date: Feb. 14, 2002

(65) Prior Publication Data
US 2004/0112973 A1 Jun. 17, 2004

(51) Int. Cl.$^7$ ............................ F25B 49/00; F25D 17/04
(52) U.S. Cl. .................... 62/176.6; 236/44 C
(58) Field of Search ....................... 62/176.6; 236/44 C, 236/47, 91 R, 91 D (56) References Cited

U.S. PATENT DOCUMENTS

| 4,889,280 A | * 12/1989 | Grald et al. ............... 236/44 C |
| 6,557,771 B2 | * 5/2003 | Shah ........................ 236/44 C |
| 2004/0154321 A1 | * 8/2004 | Strand ....................... 62/176.6 |

FOREIGN PATENT DOCUMENTS

| JP | 08-005131 A | 1/1996 |
| JP | 63-294445 A | 12/1998 |

* cited by examiner

Primary Examiner—Marc Norman
(74) Attorney, Agent, or Firm—Blakely Sokoloff Taylor & Zafman (57) ABSTRACT

A temperature control output branch unit D_MV_Temp outputs a manipulated variable to a heating actuator Act1 when the manipulated variable output MVT of a temperature controller PID_Temp is in a heating mode, and outputs it to a cooling actuator Act2 when the output MVT is in a cooling mode. A humidity control output branch unit D_MV_Hum outputs a manipulated variable to a humidifying actuator Act3 when the manipulated variable output MVH of a humidity controller PID_Hum is in a humidifying mode, and outputs it to the actuator Act2 when the output MVH is in a dehumidifying mode. A cooling output maximum value operation unit C_MAX gives whichever is larger of respective manipulated variable outputs from the branch units D_MV_Temp and D_MV_Hum to the actuator Act2.

6 Claims, 5 Drawing Sheets

METHOD OF CONTROLLING TEMPERATURE/HUMIDITY OR TEMPERATURE AND DEVICE FOR CONTROLLING TEMPERATURE/HUMIDITY OR TEMPERATURE

The present patent application is a non-provisional application of International Application No. PCT/JP01/06732, filed Aug., 6, 2001.

BACKGROUND OF THE INVENTION

The present invention relates to a method of controlling temperature/humidity or temperature and device for controlling temperature/humidity or temperature which can realize energy saving in a temperature/humidity control system using a heating actuator, cooling actuator, or humidifying actuator, or in a temperature control system using a heating actuator as a main actuator and a cooling actuator as an auxiliary actuator.

An air-conditioning control system in a building or the like includes a cooler for cooling and a heater for heating. The humidity is also controlled in many cases in order to increase the comfortableness. For this purpose, the system additionally has a humidifier and performs temperature/humidity control by which the temperature and humidity are controlled at the same time. Note that no additional dehumidifier is necessary because the cooler has a dehumidifying effect as its function. Similarly, temperature/humidity control using a cooler, heater, and humidifier is performed in a temperature/humidity controlled bath.

Also, if in a temperature control system using a cooler and heater the output resolution of the cooler is not so high and such precise temperature control as in a temperature controlled bath is required, pre-cooling/re-heating control is performed by which supercooling is performed by the cooler, and then an optimum temperature is set by heating with the heater.

In the temperature/humidity control system described above, output cancellation is performed by which a decrease in humidity caused when the cooler is operated for cooling is compensated for by the humidifier, and a decrease in temperature caused when the cooler is operated for dehumidification is compensated for by the heater. If this output cancellation is inappropriately performed, however, energy is wasted. Especially in the temperature/humidity control system, the three actuators, i.e., the cooler, heater, and humidifier are sometimes simultaneously operated to perform the output cancellation. This increases the energy consumption.

Also, in the pre-cooling/re-heating type temperature control system, output cancellation is performed by first performing pre-cooling by the cooler and then performing heating by the heater. Therefore, if this output cancellation is inappropriately performed, the energy consumption increases.

SUMMARY OF THE INVENTION

The present invention has been made to solve the above problems, and has as its object to provide a method of controlling temperature/humidity or temperature and device for controlling temperature/humidity or temperature which can realize energy saving by minimizing output cancellation in a temperature/humidity control system or in a temperature control system.

In a temperature/humidity control method of the present invention, a manipulated variable output to a cooling actuator, of manipulated variable outputs to a heating actuator and the cooling actuator of a controller for controlling temperature, is compared with a manipulated variable output to the cooling actuator, of manipulated variable outputs to a humidifying actuator of a controller for controlling humidity and to the cooling actuator, and a larger manipulated variable output is given to the cooling actuator. This arrangement guarantees that a maximum of two of the three actuators operate in the temperature/humidity control system.

In a temperature control method of the present invention, a manipulated variable output from a controller for controlling heating is given as a controlled variable input to a controller for controlling cooling, and an ideal value of the manipulated variable output is given as a set point to the controller for controlling cooling.

A temperature/humidity control device of the present invention comprises a heating actuator (Act1) for realizing a heating function of temperature control, a cooling actuator (Act2) for realizing a cooling function of temperature control and a dehumidifying function of humidity control, a humidifying actuator (Act3) for realizing a humidifying function of humidity control, a temperature controller (PID_Temp) for controlling temperature, a humidity controller (PID_Hum) for controlling humidity, a temperature control output branch unit (D_MV_Temp) for outputting a manipulated variable output (MVT) from the temperature controller to the heating actuator if the value of this manipulated variable output corresponds to a heating mode, and outputting the manipulated variable output from the temperature controller to the cooling actuator if the value of this manipulated variable output corresponds to a cooling mode, a humidity control output branch unit (D_MV_Hum) for outputting a manipulated variable output (MVH) from the humidity controller to the humidifying actuator if the value of this manipulated variable output corresponds to a humidifying mode, and outputting the manipulated variable output from the humidity controller to the cooling actuator if the value of this manipulated variable output corresponds to a dehumidifying mode, and a cooling output maximum value operation unit (C_MAX) which is placed between the temperature control output branch unit and the cooling actuator and between the humidity control output branch unit and the cooling actuator, compares the manipulated variable outputs from the temperature control output branch unit and the humidity control output branch unit, and gives a larger manipulated variable output to the cooling actuator.

A temperature/humidity control device of the present invention comprises a heating actuator (Act1) for realizing a heating function of temperature control, a cooling actuator (Act2) for realizing a cooling function of temperature control and a dehumidifying function of humidity control, a humidifying actuator (Act3) for realizing a humidifying function of humidity control, a heating temperature controller (PID_Temp1) for controlling heating and giving a manipulated variable output (MV1) to the heating actuator, a cooling temperature controller (PID_Temp2) for controlling cooling and giving a manipulated variable output (MV2) to the cooling actuator, a humidifying humidity controller (PID_Hum3) for controlling humidifying and giving a manipulated variable output (MV3) to the humidifying actuator, a dehumidifying humidity controller (PID_Hum4) for controlling dehumidification and giving a manipulated variable output (MV4) to the cooling actuator, a temperature controller switching unit (CH_Temp) for operating the heating temperature controller in a heating mode, and operating the cooling temperature controller in a cooling mode, a humidity controller switching unit (CH_Hum) for operating the humidifying humidity controller in a humidifying mode, and operating the dehumidifying humidity controller in a dehumidifying mode, and a cooling output maximum value operation unit (C_MAX) which is placed between the cooling temperature controller and the cooling actuator and between the dehumidifying humidity controller and the cooling actuator, compares the manipulated variable outputs (MV2, MV4) from the cooling temperature controller and dehumidifying humidity controller, and gives a larger manipulated variable output to the cooling actuator.

A temperature control device of the present invention comprises a heating actuator (Act1) for realizing a heating function of temperature control, a cooling actuator (Act2) for realizing a cooling function of temperature control, a heating temperature controller (PID_H) for controlling heating and giving a manipulated variable output (MVH0) to the heating actuator, and a cooling temperature controller (PID_C) which receives the manipulated variable output from the heating temperature controller as a controlled variable input, performs an operation by using an ideal value of the manipulated variable output as a set point, and outputs a manipulated variable output (MVC0) as a result of the operation to the cooling actuator.

A temperature/humidity control device of the present invention comprises a heating actuator (Act1) for realizing a heating function of temperature control, a cooling actuator (Act2) for realizing a cooling function of temperature control and a dehumidifying function of humidity control, a humidifying actuator (Act3) for realizing a humidifying function of humidity control, a temperature controller (PID_Temp) for controlling temperature, a humidity controller (PID_Hum) for controlling humidity, a temperature control output branch unit (D_MV Temp) for outputting a manipulated variable output (MVT) from the temperature controller to the heating actuator if the value of this manipulated variable output corresponds to a heating mode, and outputting the manipulated variable output from the temperature controller to the cooling actuator if the value of this manipulated variable output corresponds to a cooling mode, a humidity control output branch unit (D_MV_Hum) for outputting a manipulated variable output (MVH) from the humidity controller to the humidifying actuator if the value of this manipulated variable output corresponds to a humidifying mode, and outputting the manipulated variable output from the humidity controller to the cooling actuator if the value of this manipulated variable output corresponds to a dehumidifying mode, a cooling temperature controller (PID_C) which receives the manipulated variable output from the temperature control output branch unit as a controlled variable input, performs an operation by using an ideal value of the manipulated variable output as a set point, and outputs a manipulated variable output (MVC0) as a result of the operation to the cooling actuator, and a cooling output maximum value operation unit (C_MAX2) which is placed between the cooling actuator and the temperature control output branch unit, humidity control output branch unit, and cooling temperature controller, compares the manipulated variable outputs from the temperature control output branch unit, humidity control output branch unit, and cooling temperature controller, and gives a larger manipulated variable output to the cooling actuator.

DETAILED DESCRIPTION OF THE INVENTION

[First Embodiment]

Figure 1:
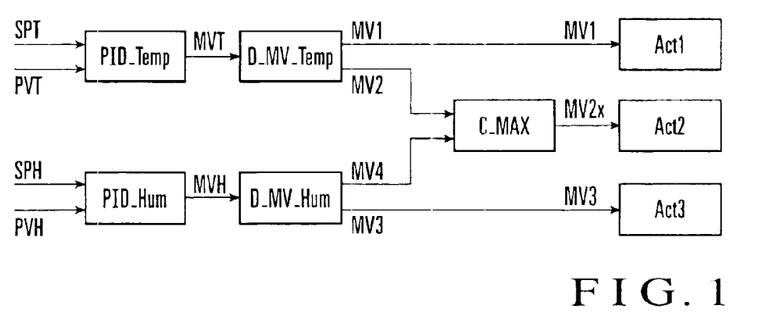
FIG. 1 is a block diagram showing the arrangement of a temperature/humidity control device as the first embodiment of the present invention.

An embodiment of the present invention will be described in detail below with reference to the accompanying drawings. FIG. 1 is a block diagram showing the arrangement of a temperature/humidity control device as the first embodiment of the present invention. This temperature/humidity control device shown in FIG. 1 comprises a temperature controller PID_Temp for controlling temperature, a humidity controller PID_Hum for controlling humidity, a temperature control output branch unit D_MV_Temp for branching and outputting a manipulated variable output MVT from the temperature controller PID_Temp, a humidity control output branch unit D_Mv_Hum for branching and outputting a manipulated variable output MVH from the humidity controller PID_Hum, a cooling output maximum value operation unit C_MAX for comparing the manipulated variable outputs from the temperature control output branch unit D_MV_Temp and humidity control output branch unit D_MV_Hum and giving the largest manipulated variable output to a cooling actuator Act2, a heating actuator Act1 such as a heater for realizing a heating function of temperature control, the cooling actuator Act2 such as a cooler for realizing a cooling function of temperature control, and a humidifying actuator Act3 such as a humidifier for realizing a humidifying function of humidity control. Note that a dehumidifying function of humidity control is achieved by the cooling actuator Act2.

This embodiment is applicable to a temperature/humidity control system for air in a bath such as a temperature/humidity controlled bath or in a room such as a clean room or greenhouse, when energy saving is to be achieved by suppressing output cancellation of a heating/cooling function and output cancellation of a humidifying/dehumidifying function.

Figure 2:
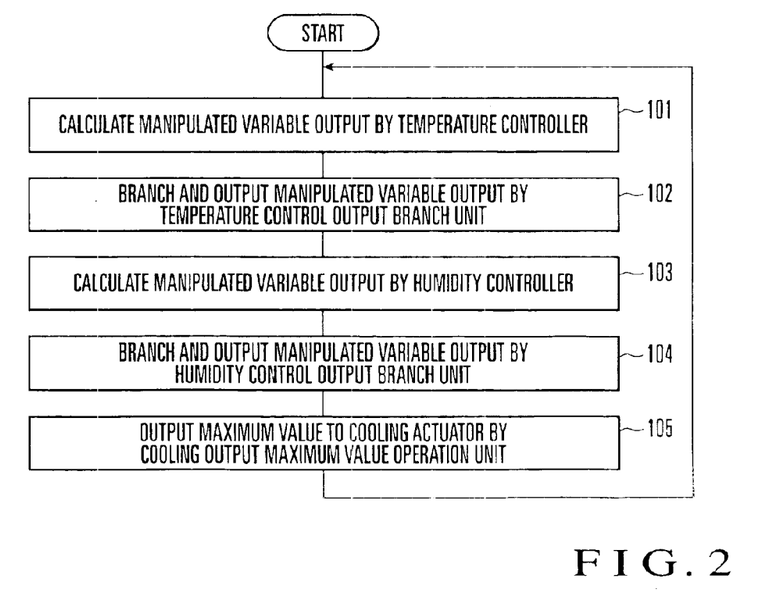
FIG. 2 is a flow chart for explaining the operation of the temperature/humidity control device shown in FIG. 1.

The operation of the temperature/humidity control device of this embodiment will be explained below. FIG. 2 is a flow chart showing the operation of the temperature/humidity control device shown in FIG. 1.

Initially, the temperature controller PID_Temp executes a PID operation to calculate the manipulated variable MVT (step 101 in FIG. 2). This temperature controller PID_Temp is constructed by general heat-cool control logic. Heat-cool control is a control technology which selectively uses heating capability and cooling capability.

In short, this heat-cool control is a control method by which, if the manipulated variable output MVT from the temperature controller PID_Temp is larger than 50%, the heating actuator Act1 is operated in accordance with the manipulated variable output MVT, and, if this manipulated variable output MVT is 50% or less, the cooling actuator Act2 is operated in accordance with the manipulated variable output MVT.

Also, in this heat-cool control, if the manipulated variable output MVT from the temperature controller PID_Temp becomes 50% or less during control in a heating mode, the mode is immediately switched to a cooling mode. If the manipulated variable output MVT exceeds 50% during control in the cooling mode, the mode is immediately switched to the heating mode.

Accordingly, when the manipulated variable output is normalized to 0 to 100%, the temperature controller PID_Temp determines that the heating mode is set, if a manipulated variable output MVT-1 in an immediately preceding control period is larger than 50%. The temperature controller PID_Temp calculates the manipulated variable output MVT in the current control period by using PID parameters for heating as indicated by $$MVT = Kg1\{1+1/(Ti1\ s)+Td1\ s\}(SPT-PVT) \quad (1)$$

where Kg1, Ti1, and Td1 are the heating-side proportional gain, heating-side integral time, and heating-side derivative time, respectively, of the temperature controller PID_Temp, SPT is a temperature set point which is set for an object (not shown) to be controlled by the temperature controller PID_Temp, and PVT is a controlled variable (temperature measurement value) of this object of control. The heating-side proportional gain Kg1, heating-side integral time Ti1, heating-side derivative time Td1, and temperature set point SPT are preset by an operator, and the controlled variable PVT is measured by a temperature sensor (not shown).

Also, if the manipulated variable output MVT-1 in the immediately preceding control period is 50% or less, the temperature controller PID_Temp determines that the cooling mode is set. The temperature controller PID_Temp calculates the manipulated variable output MVT in the current control period by using PID parameters for cooling as indicated by $$MVT = Kg2(1+1/(Ti2\ s)+Td2\ s)(SPT-PVT) \quad (2)$$

where Kg2, Ti2, and Td2 are the cooling-side proportional gain, cooling-side integral time, and cooling-side derivative time, respectively, of the temperature controller PID_Temp. These cooling-side proportional gain Kg2, cooling-side integral time Ti2, and cooling-side derivative time Td2 are preset by an operator. In this manner, the processing in step 101 is complete.

The temperature control output branch unit D_MV_Temp branches the manipulated variable output MVT from the temperature controller PID_Temp, and outputs them to the actuators Act1 and Act2 (step 102).

In step 102, if the manipulated variable output MVT is larger than 50%, the temperature control output branch unit D_MV_Temp determines that the heating mode is set, and outputs to the heating actuator Act1 a manipulated variable indicating value MV1 as indicated by $$MV1 = 2(MVT-50) \quad (3)$$

Also, if the manipulated variable output MVT is 50% or less, the temperature control output branch unit D_MV_Temp determines that the cooling mode is set, and outputs to the cooling output maximum value operation unit C_MAX a manipulated variable indicating value MV2 as indicated by $$MV2 = 2(50-MVT) \quad (4)$$

In this way, the processing in step 102 is complete.

Figure 3:
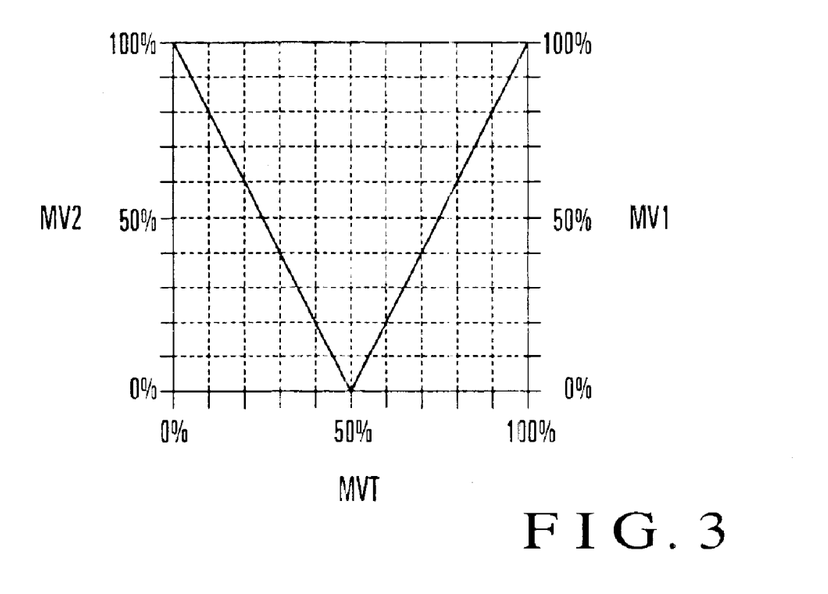
FIG. 3 is a graph showing the relationships between a manipulated variable output from a temperature controller and manipulated variable indicating values from a temperature control output branch unit.

FIG. 3 is a graph showing the relationships between the manipulated variable output MVT and the manipulated variable indicating values MV1 and MV2. As shown in FIG. 3, the temperature control output branch unit D_MV_Temp outputs the manipulated variable output MVT by converting it into the manipulated variable indicating value MV1 or MV2 of 0 to 100%.

Then, the humidity controller PID_Hum executes a PID operation to calculate the manipulated variable output MVH (step 103). This humidity controller PID_Hum is constructed by general heat-cool control logic. In this heat-cool control, if the manipulated variable output MVH from the humidity controller PID_Hum is larger than 50%, the humidifying actuator Act3 is operated in accordance with the manipulated variable output MVH. If this manipulated variable output MVH is 50% or less, the cooling actuator Act2 is operated in accordance with the manipulated variable output MVH.

Also, in this heat-cool control, if the manipulated variable output MVH becomes 50% or less during control in a humidifying mode, the mode is immediately switched to a dehumidifying mode. If the manipulated variable output MVH exceeds 50% during control in the dehumidifying mode, the mode is immediately switched to the humidifying mode.

Accordingly, when the manipulated variable output is normalized to 0 to 100%, the humidity controller PID_Hum determines that the humidifying mode is set, if a manipulated variable output MVH-1 in an immediately preceding control period is larger than 50%. The humidity controller PID_Hum calculates the manipulated variable output MVH in the current control period by using PID parameters for humidifying as indicated by $$MVH = Kg3(1+1/(Ti3\ s)+Td3\ s)(SPH-PVH) \quad (5)$$

where Kg3, Ti3, and Td3 are the humidifying-side proportional gain, humidifying-side integral time, and humidifying-side derivative time, respectively, of the humidity controller PID_Hum, SPH is a humidity set point which is set for an object (not shown) to be controlled by the humidity controller PID_Hum, and PVH is a controlled variable (humidity measurement value) of this object of control. The humidifying-side proportional gain Kg1, humidifying-side integral time Ti1, humidifying-side derivative time Td1, and humidity set point SPH are preset by an operator, and the controlled variable PVH is measured by a humidity sensor (not shown).

Also, if the manipulated variable output MVH-1 in the immediately preceding control period is 50% or less, the humidity controller PID_Hum determines that the dehumidifying mode is set, and calculates the manipulated variable output MVH in the current control period by using PID parameters for dehumidifying as indicated by $$MVH=Kg4(1+1/(Ti4\ s)+Td4\ s)(SPH-PVH) \quad (6)$$

where Kg4, Ti4, and Td4 are the dehumidifying-side proportional gain, dehumidifying-side integral time, and dehumidifying-side derivative time, respectively, of the humidity controller PID_Hum. These dehumidifying-side proportional gain Kg4, dehumidifying-side integral time Ti4, and dehumidifying-side derivative time Td4 are preset by an operator. In this manner, the processing in step 103 is complete.

The humidity control output branch unit D_MV_Hum branches the manipulated variable output MVH from the humidity controller PID_Hum, and outputs them to the actuators Act2 and Act3 (step 104).

In step 104, if the manipulated variable output MVH is larger than 50%, the humidity control output branch unit D_MV_Hum determines that the humidifying mode is set, and outputs to the heating actuator Act3 a manipulated variable indicating value MV3 as indicated by $$MV3=2(MVH-50) \quad (7)$$

Also, if the manipulated variable output MVH is 50% or less, the humidity control output branch unit D_MV_Hum determines that the dehumidifying mode is set, and outputs to the cooling output maximum value operation unit C_MAX a manipulated variable indicating value MV4 as indicated by $$MV4=2(50-MVH) \quad (8)$$

In this way, the processing in step 104 is complete.

Figure 4:
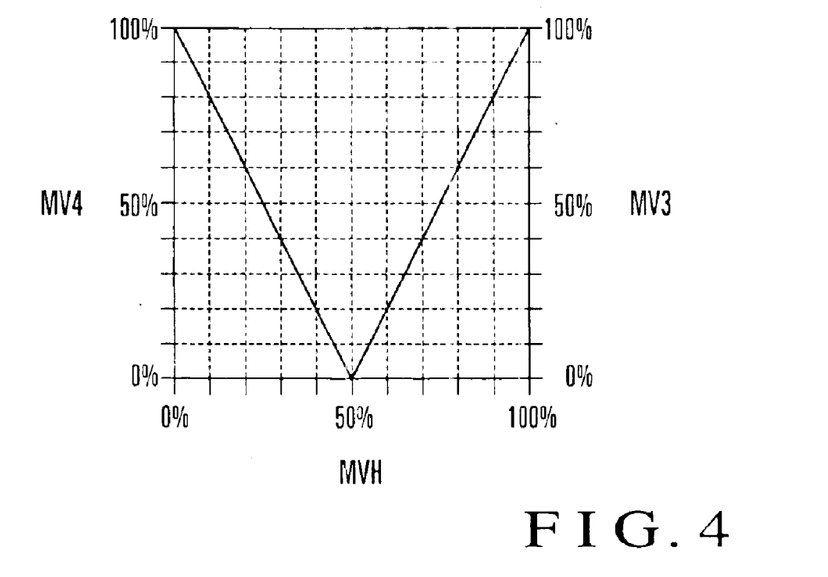
FIG. 4 is a graph showing the relationships between a manipulated variable output from a humidity controller and manipulated variable indicating values from a humidity control output branch unit.

FIG. 4 is a graph showing the relationships between the manipulated variable output MVH and the manipulated variable indicating values MV3 and MV4. As shown in FIG. 4, the humidity control output branch unit D_MV_Hum outputs the manipulated variable output MVH by converting it into the manipulated variable indicating value MV3 or MV4 of 0 to 100%.

After that, the cooling output maximum value operation unit C_MAX calculates a maximum value MV2x of the manipulated variable indicating value MV2 output from the temperature control output branch unit D_MV_Temp and the manipulated variable indicating value MV4 output from the humidity control output branch unit D_MV_Hum, and outputs this maximum value MV2x to the cooling actuator Act2 (step 105).

That is, if the manipulated variable indicating value MV2 is larger than the manipulated variable indicating value MV4, the cooling output maximum value operation unit C_MAX outputs the manipulated variable indicating value MV2 as the maximum value MV2x to the cooling actuator Act2. If the manipulated variable indicating value MV2 is equal to or smaller than the manipulated variable indicating value MV4, the cooling output maximum value operation unit C_MAX outputs the manipulated variable indicating value MV4 as the maximum value MV2x to the cooling actuator Act2.

Steps 101 to 105 described above make up a process in one control period, and this process in steps 101 to 105 is repeated for each control period.

In the interlocked operation of the temperature controller PID_Temp and temperature control output branch unit D_Mv_Temp as described above, the manipulated variable indicating value MV1 to the heating actuator Act1 and the manipulated variable indicating value MV2 to the cooling actuator Act2 are calculated and output on the basis of the general heat-cool control logic. Since the heat-cool control logic is used, these manipulated variable indicating values MV1 and MV2 are in principle not simultaneously larger than 0%.

In the interlocked operation of the humidity controller PID_Hum and humidity control output branch unit D_MV_Hum as described above, the manipulated variable indicating value MV3 to the humidifying actuator Act3 and the manipulated variable indicating value MV4 to the cooling actuator Act2 are calculated and output on the basis of the general heat-cool control logic. Since the heat-cool control logic is used, these manipulated variable indicating values MV3 and MV4 are in principle not simultaneously larger than 0%.

Since the heating actuator Act1 is dedicated to temperature control, the manipulated variable indicating value MV1 calculated on the temperature control side (the temperature controller PID_Temp and temperature control output branch unit D_MV_Temp) is directly output to the heating actuator Act1.

Since the humidifying actuator Act3 is dedicated to humidity control, the manipulated variable indicating value MV3 calculated on the humidity control side (the humidity controller PID_Hum and humidity control output branch unit D_MV_Hum) is directly output to the humidifying actuator Act3.

The cooling actuator Act2 is used in both temperature control and humidity control. Therefore, the cooling output maximum value operation unit C_MAX calculates the maximum value MV2x of the manipulated variable indicating value MV2 calculated on the temperature control side and the manipulated variable indicating value MV4 calculated on the humidity control side. This maximum value MV2x is output to the cooling actuator Act2.

If the manipulated variable indicating value MV2 calculated on the temperature control side is smaller than the manipulated variable indicating value MV4 calculated on the humidity control side, the output to the cooling actuator Act2 is excess, i.e., cooling is excess from the viewpoint of the temperature control side. Therefore, the temperature measurement value PVT becomes smaller than the set point SPT with time. This switches the temperature controller PID_Temp from the cooling mode to the heating mode, and the manipulated variable output MVT larger/than 50% is output. As a consequence, the manipulated variable indicating value MV1 larger than 0% is output to the heating actuator Act1.

On the other hand, if the manipulated variable indicating value MV4 calculated on the humidity control side is smaller than the manipulated variable indicating value MV2 calculated on the temperature control side, the output to the cooling actuator Act2 is excess, i.e., dehumidification is excess from the viewpoint of the humidity control side. Accordingly, the humidity measurement value PVH becomes smaller than the set point SPH with time. This switches the humidity controller PID_Hum from the dehumidifying mode to the humidifying mode, and the manipulated variable output MVH larger than 50% is output. As a consequence, the manipulated variable indicating value MV3 larger than 0% is output to the humidifying actuator Act3.

In the temperature/humidity control system with the above arrangement, it is possible to guarantee that a maximum of only two of the three actuators operate. This reliably limits the occurrence of output cancellation to one of output cancellation of the heating/cooling function related to temperature control and output cancellation of the humidifying/dehumidifying function related to humidity control. Consequently, it is possible to realize control close to minimum output for the temperature/humidity control system as a whole, and achieve energy saving.

[Second Embodiment]

Figure 5:
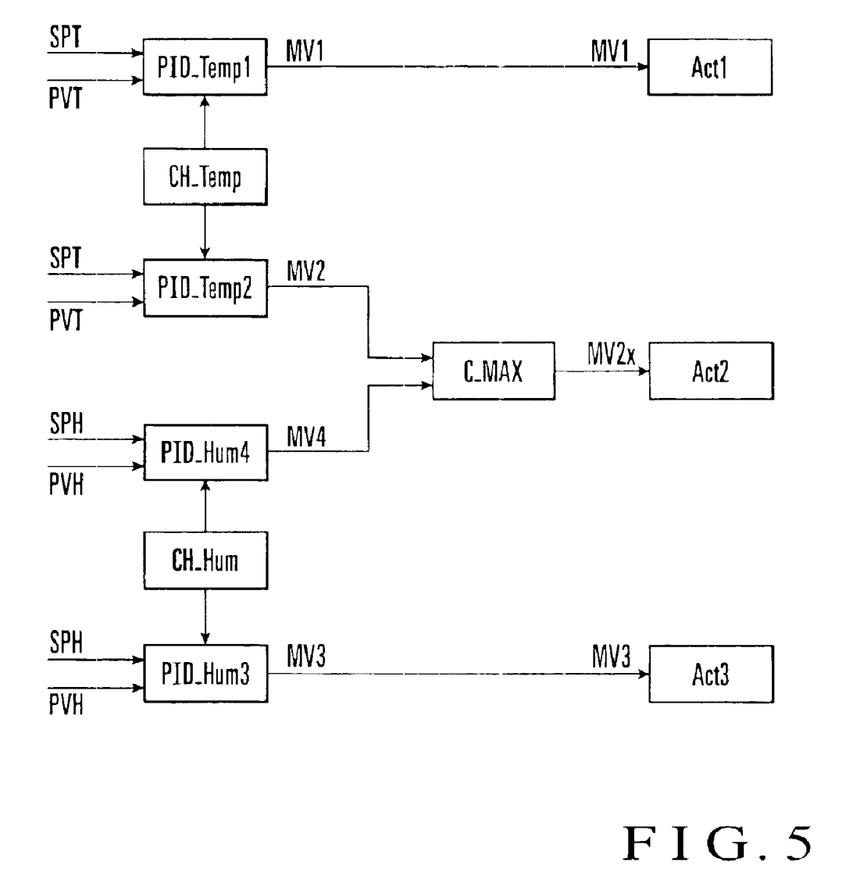
FIG. 5 is a block diagram showing the arrangement of a temperature/humidity control device as the second embodiment of the present invention.

FIG. 5 is a block diagram showing the arrangement of a temperature/humidity control device as the second embodiment of the present invention. The same reference numerals as in FIG. 1 denote the same parts. This temperature/humidity control device shown in FIG. 5 comprises a heating temperature controller PID_Temp1 for controlling heating, a cooling temperature controller PID_Temp2 for controlling cooling, a humidifying humidity controller PID_Hum3 for controlling humidifying, a dehumidifying humidity controller PID_Hum4 for controlling dehumidification, a temperature controller switching unit CH_Temp for switching the controllers PID_Temp1 and PID_Temp2, a humidity controller switching unit CH_Hum for switching the controllers PID_Hum3 and PID_Hum4, a cooling output maximum value operation unit C_MAX, a heating actuator Act1, a cooling actuator Act2, and a humidifying actuator Act3.

An object of this embodiment is an air-conditioning control system. For example, the controller PID_Temp1 is an air-conditioning heating controller, the controller PID_Temp2 is an air-conditioning cooling controller, the controller PID_Hum3 is an air-conditioning humidifying controller, and the controller PID_Hum4 is an air-conditioning dehumidification controller.

When a heating request is generated, the temperature controller switching unit CH_Temp operates the heating temperature controller PID_Temp1. This heating temperature controller PID_Temp1 calculates a manipulated variable output MV1 of 0 to 100% for heating in the same manner as equation (1) explained in the first embodiment.

When a cooling request is generated, the temperature controller switching unit CH_Temp operates the cooling temperature controller PID_Temp2. This cooling temperature controller PID_Temp2 calculates a manipulated variable output MV2 of 0 to 100% for cooling in the same manner as equation (2) explained in the first embodiment.

When a humidifying request is generated, the humidity controller switching unit CH_Hum operates the humidifying humidity controller PID_Hum3. This humidifying humidity controller PID_Hum3 calculates a manipulated variable output MV3 of 0 to 100% for humidifying in the same manner as equation (5) explained in the first embodiment.

When a dehumidification request is generated, the humidity controller switching unit CH_Hum operates the dehumidifying humidity controller PID_Hum4. This dehumidifying humidity controller PID_Hum4 calculates a manipulated variable output MV4 of 0 to 100% for dehumidifying in the same manner as equation (6) explained in the first embodiment.

The operation of the cooling output maximum value operation unit C_MAX is exactly the same as in the first embodiment. In this way, the same effects as in the first embodiment can be obtained in an air-conditioning control system.

[Third Embodiment]

Figure 6:
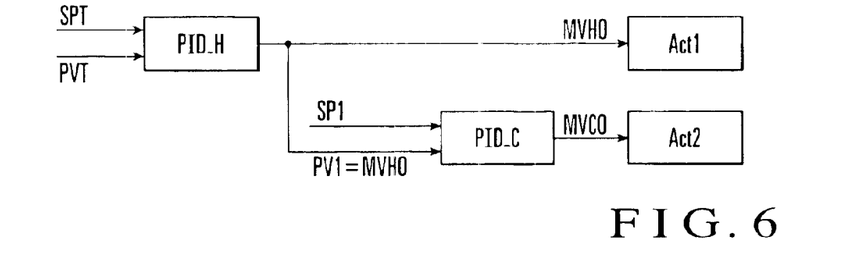
FIG. 6 is a block diagram showing the arrangement of a temperature control device as the third embodiment of the present invention.

FIG. 6 is a block diagram showing the arrangement of a temperature control device as the third embodiment of the present invention. This temperature control device shown in FIG. 6 comprises a heating temperature controller PID_H for controlling heating, a heating temperature controller PID_H which receives a manipulated variable output from the heating temperature controller PID_H as a controlled variable input and performs an operation by using an ideal value of the manipulated variable output as a set point, a cooling temperature controller PID_C, a heating actuator Act1 such as a heater, and a cooling actuator Act2 such as a cooler.

This embodiment can be applied to a temperature control system for a pre-cooling/re-heating type temperature controlled bath using a cooler and heater, when energy saving is to be realized by suppressing output cancellation of a heating/cooling function.

Figure 7:
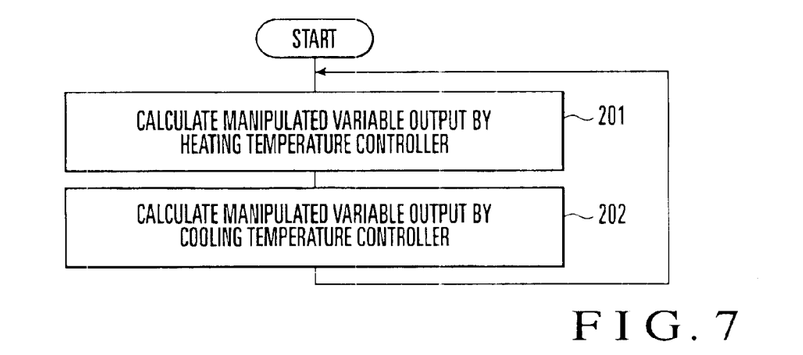
FIG. 7 is a flow chart for explaining the operation of the temperature control device shown in FIG. 6.

The operation of the temperature control device of this embodiment will be explained below. FIG. 7 is a flow chart showing the operation of the temperature control device shown in FIG. 6.

Initially, the heating temperature controller PID_H executes a PID operation to calculate a manipulated variable output MVH0 (step 201 in FIG. 7) as indicated by $$MVH0 = KgH\{1 + 1/(TiH\ s) + TdH\ s\}(SPT - PVT) \qquad (9)$$

where KgH, TiH, and TdH are the proportional gain, integral time, and derivative time, respectively, of the heating temperature controller PID_H, SPT is a temperature set point which is set for an object (not shown) to be controlled by the controller PID_H, and PVT is a controlled variable (temperature measurement value) of this object of control. The proportional gain KgH, integral time TiH, derivative time TdH, and temperature set point SPT are preset by an operator, and the controlled variable PVT is measured by a temperature sensor (not shown).

The heating temperature controller PID_H outputs the calculated manipulated variable output MVH0 to the heating actuator Act1 and cooling temperature controller PID_C.

This cooling temperature controller PID_C executes a PID operation to calculate a manipulated variable output MVC0 (step 202) as indicated by $$MVC0 = KgC\{1 + 1/(TiC\ s) + TdC\ s\}(SP1 - PV1) \qquad (10)$$

where KgC, TiC, and TdC are the proportional gain, integral time, and derivative time, respectively, of the cooling temperature controller PID_C, SP1 is a set point of this controller PID_C, and PV1 is a controlled variable of the controller PID_C. The proportional gain KgC, integral time TiC, and derivative time TdC are preset.

A value given beforehand as the set point SP1 is an ideal value (e.g., 10% when the manipulated variable output MVH0 is normalized to 0 to 100%) of the manipulated variable output MVH0, by which both energy saving and temperature control can be achieved.

Also, the cooling temperature controller PID_C performs the calculation of equation (10) by using the manipulated variable output MVH0 from the heating temperature controller PID_H as the controlled variable PV1.

The cooling temperature controller PID_C outputs the calculated manipulated variable output MVC0 to the cooling actuator Act2.

Steps 201 and 202 described above make up a process in one control period, and this process in steps 201 and 202 is repeated for each control period.

This temperature control system uses the heating actuator Act1 as a temperature control actuator. If a low-temperature side of the temperature range to be controlled cannot be well cooled by natural cooling, it is necessary to cool the supplied fluid (e.g., air) by the cooling actuator Act2. If the output from this cooling actuator Act2 has sufficient resolution and so precise temperature control is possible, it is adequate to apply general heat-cool control. However, if the resolution of the output from the cooling actuator Act2 is insufficient, re-heating is performed by the heating actuator Act1 after pre-cooling is well performed by the cooling actuator Act2. In this case, the heater output of the re-heating is the manipulated variable of temperature control.

Figure 8:
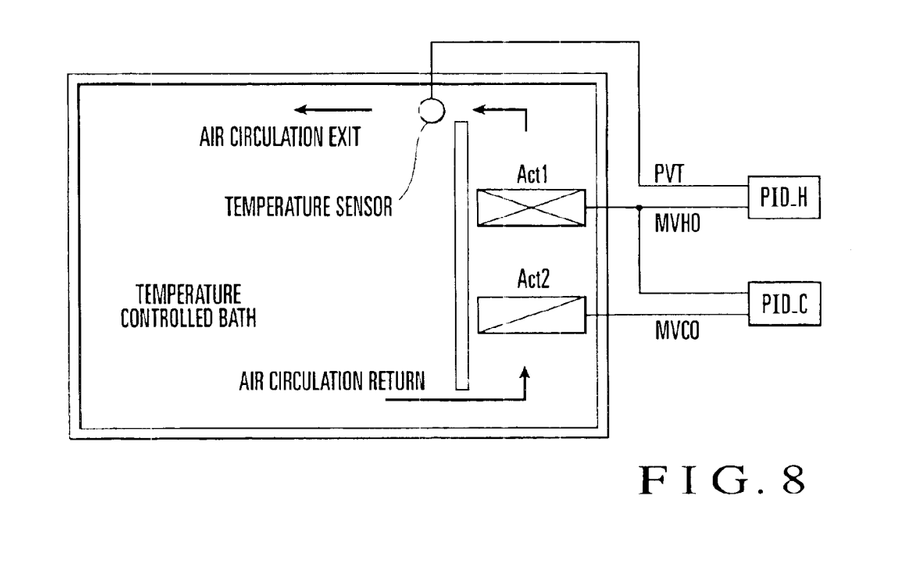
FIG. 8 is a view showing an example in which the temperature control device of the third embodiment of the present invention is used to control the temperature of a temperature controlled bath.

FIG. 8 is a view showing an example in which the temperature control device of this embodiment is used for temperature control of a temperature controlled bath. In this temperature controlled bath, the heating actuator Act1 performs heating, and the cooling actuator Act2 circulates cooled air.

The heating temperature controller PID_H calculates the manipulated variable output MVH0 for heating on the basis of PID logic.

To realize a state in which a cooling effect can be obtained by lowering the output of the heating actuator Act1, re-heating control must be performed while the manipulated variable output MVH0 from the heating temperature controller PID_H is at least about 10%. The cooling actuator Act2 for performing pre-cooling is controlled by using this manipulated variable output MVH0 for heating as a controlled variable.

That is, the cooling temperature controller PID_C uses an ideal value of the heating manipulated variable output MVH0 of the heating temperature controller PID_H as the set point SP1, uses the actual heating manipulated variable output MVH0 as the controlled variable PV1, and calculates the manipulated variable output MVC0 on the basis of PID logic.

If the manipulated variable output MVH0 for heating is higher than the ideal value (set point) SP1, pre-cooling by the cooling actuator Act2 is excess. In this case, the cooling temperature controller PID_C so functions as to lower the manipulated variable output MVC0. This reduces the effect of pre-cooling, and the heating manipulated variable output MVH0 necessary for re-heating also lowers along with the rise of the controlled variable PVT. Accordingly, the manipulated variable output MVH0 approaches to be equal to the ideal value SP1.

If, on the other hand, the manipulated variable output MVH0 for heating is lower than the ideal value SP1, pre-cooling by the cooling actuator Act2 is insufficient. In this case, the cooling temperature controller PID_C so functions as to raise the manipulated variable output MVC0. This increases the effect of pre-cooling, and the heating manipulated variable output MVH0 necessary for re-heating also rises along with the decrease in the controlled variable PVT. Therefore, the manipulated variable output MVH0 approaches to be equal to the ideal value SP1.

If an operator switches the temperature set point SPT from, e.g., a lower value to a higher value, a heating request is generated, so the heating temperature controller PID_H raises the manipulated variable output MVH0. Since the manipulated variable output MVH0 for heating becomes higher than the ideal value SP1, the cooling temperature controller PID_C determines that pre-cooling is excess, and so functions as to lower this manipulated variable output MVC0. Therefore, the cooling actuator Act2 operates so as not to interfere with heating.

On the other hand, if an operator switches the temperature set point SPT from a high value to a low value, a cooling request is generated, so the heating temperature controller PID_H lowers the manipulated variable output MVH0. Since the manipulated variable output MVH0 for heating becomes lower than the ideal value SP1, the cooling temperature controller PID_C determines that pre-cooling is insufficient, and so functions as to raise this manipulated variable output MVC0. Therefore, the cooling actuator Act2 operates so as to accelerate cooling.

In the temperature control system using the heating actuator Act1 as a main actuator and the cooling actuator Act2 as an auxiliary actuator, the above-mentioned arrangement makes it possible to maintain pre-cooling/re-heating while avoiding output cancellation (excess pre-cooling or insufficient pre-cooling) of the heating/cooling function. As a consequence, it is possible to realize control close to minimum output for the temperature control system as a whole, and achieve energy saving. In addition, since the cooling actuator Act2 can be appropriately operated even when a heating request or cooling request is generated, high controllability can be obtained.

[Fourth Embodiment]

Figure 9:
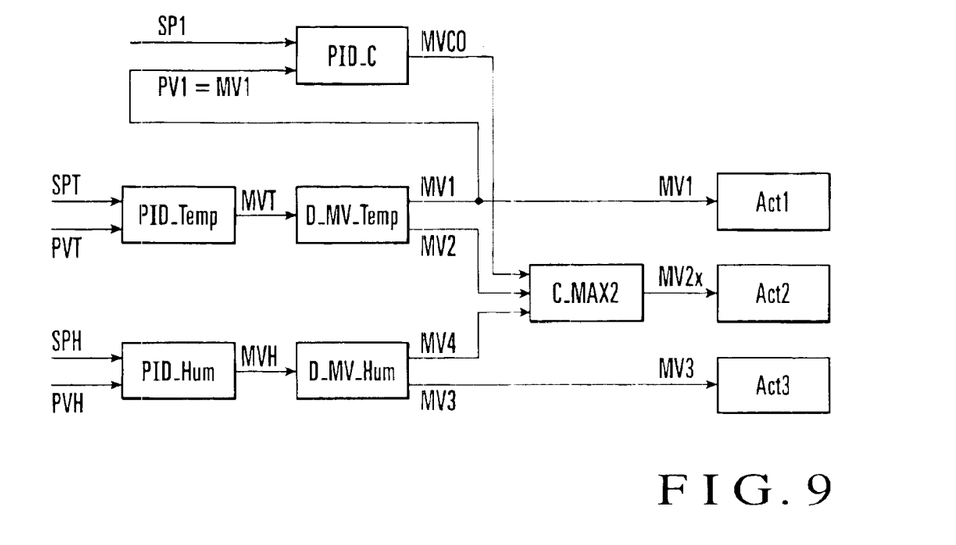
FIG. 9 is a block diagram showing the arrangement of a temperature/humidity control device as the fourth embodiment of the present invention.

FIG. 9 is a block diagram showing the arrangement of a temperature/humidity control device as the fourth embodiment of the present invention. This temperature/humidity control device shown in FIG. 9 includes a temperature controller PID_Temp, a humidity controller PID_Hum, a cooling temperature controller PID_C, a temperature control output branch unit D_MV_Temp, a humidity control output branch unit D_MV_Hum, a cooling output maximum value operation unit C_MAX2 which compares the manipulated variable outputs from the temperature control output branch unit D_MV_Temp, humidity control output branch unit D_MV_Hum, and cooling temperature controller PID_C, and gives the largest manipulated variable output to a cooling actuator Act2, a heating actuator Act1, the cooling actuator Act2, and a humidifying actuator Act3.

This embodiment is a combination of the first and third embodiments described above. That is, this embodiment is applicable to a temperature/humidity control system for, e.g., a temperature/humidity controlled bath using the heating actuator Act1, cooling actuator Act2, and humidifying actuator Act3 as actuators, when energy saving is to be achieved by suppressing output cancellation of a heating/cooling function and output cancellation of a humidifying/dehumidifying function.

Figure 10:
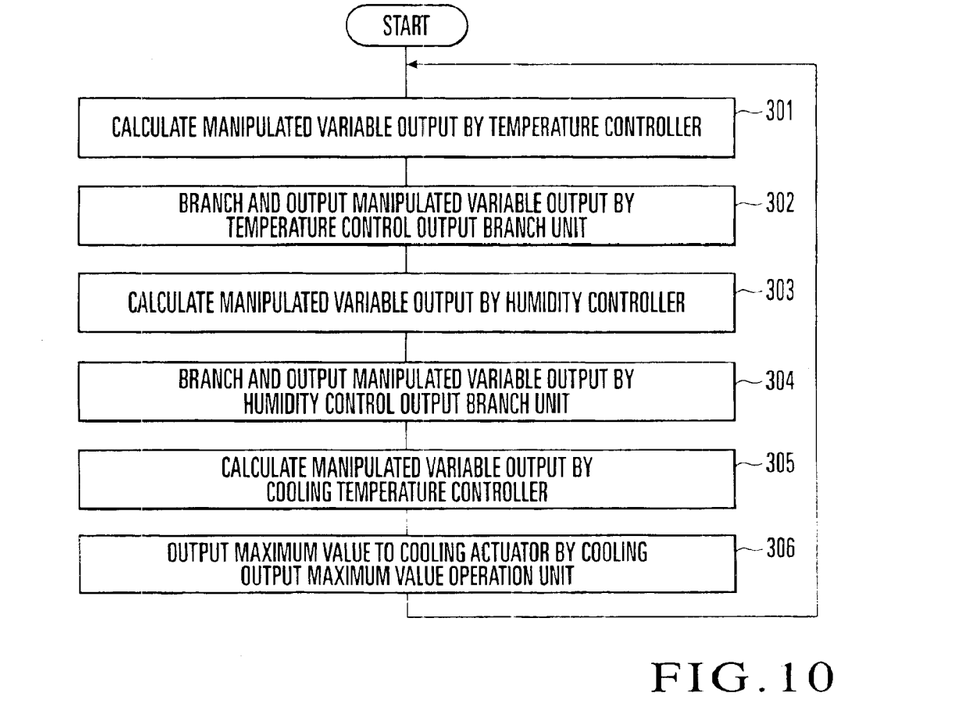
FIG. 10 is a flow chart for explaining the operation of the temperature/humidity control device shown in FIG. 9.

The operation of the temperature/humidity control device of this embodiment will be explained below. FIG. 10 is a flow chart showing the operation of the temperature/humidity control device shown in FIG. 9.

Initially, the temperature controller PID_Temp executes a PID operation to calculate a manipulated variable MVT (step 301 in FIG. 10). This operation is exactly the same as the operation of the temperature controller PID_Temp explained in the first embodiment.

The temperature control output branch unit D_MV Temp branches the manipulated variable output MVT from the temperature controller PID_Temp, and outputs it to the actuators Act1 and Act2 (step 302). This operation is exactly the same as the operation of the temperature control output branch unit D_MV_Temp explained in the first embodiment.

Then, the humidity controller PID_Hum executes a PID operation to calculate a manipulated variable output MVH (step 303). This operation is entirely the same as the operation of the humidity controller PID_Hum explained in the first embodiment.

The humidity control output branch unit D_MV_Hum branches the manipulated variable output MVH from the humidity controller PID_Hum, and outputs it to the actuators Act2 and Act3 (step 304). This operation is entirely the same as the operation of the humidity control output branch unit D_MV_Hum explained in the first embodiment.

Subsequently, the cooling temperature controller PID_C executes a PID operation to calculate a manipulated variable output MVC0 (step 305). This operation is substantially the same as the operation of the cooling temperature controller PID_C explained in the third embodiment. However, a value given beforehand as the set point SP1 of equation (10) is an ideal value of a manipulated variable indicating value MV1, by which both energy saving and temperature control can be accomplished. Also, the cooling temperature controller PID_C performs the calculation of equation (10) by using the manipulated variable indicating value MV1 output from the temperature control output branch unit D_MV Temp as a controlled variable PV1.

After that, the cooling output maximum value operation unit C_MAX2 calculates a maximum value MV2x of a manipulated variable indicating value MV2 output from the temperature control output branch unit D_MV Temp, a manipulated variable indicating value MV4 output from the humidity control output branch unit D_MV_Hum, and the manipulated variable output MVC0 output from the cooling temperature controller PID_C, and outputs this maximum value MV2x to the cooling actuator Act2 (step 306).

That is, if the manipulated variable indicating value MV2 is larger than the manipulated variable indicating value MV4, the cooling output maximum value operation unit C_MAX2 sets the manipulated variable indicating value MV2 as the maximum value MV2x. If the manipulated variable indicating value MV2 is equal to or smaller than the manipulated variable indicating value MV4, the cooling output maximum value operation unit C_MAX2 sets the manipulated variable indicating value MV4 as the maximum value MV2x.

Furthermore, if the manipulated variable output MVC0 is larger than the maximum value MV2x, the cooling output maximum value operation unit C_MAX2 outputs this manipulated variable output MVC0 as the final maximum value MV2x to the cooling actuator Act2. If the manipulated variable output MVC0 is equal to or smaller than the maximum value MV2x, the cooling output maximum value operation unit C_MAX2 directly outputs the maximum value MV2x to the cooling actuator Act2.

Steps 301 to 306 described above make up a process in one control period, and this process in steps 301 to 306 is repeated for each control period.

In this embodiment as described above, the cooling temperature controller PID_C uses an ideal value (e.g., 10%) of the manipulated variable indicating value MV1 as the set point SP1, uses the actual manipulated variable indicating value MV1 as the controlled variable PV1, and calculates the manipulated variable output MVC0 on the basis of PID logic.

The cooling output maximum value operation unit C_MAX2 calculates the maximum value MV2x of the cooler manipulated variable indicating value MV2 calculated on the temperature control side, the cooler manipulated variable indicating value MV4 calculated on the humidity control side, and the cooler manipulated variable indicating value MVC0 calculated by the cooling temperature controller PID_C. This maximum value MV2x is output to the cooling actuator Act2.

In the temperature/humidity control system using the heating actuator Act1, cooling actuator Act2, and humidifying actuator Act3 as actuators, especially in the control system which uses the heating actuator Act1 as a main actuator and the cooling actuator Act2 as an auxiliary actuator in temperature control, the above arrangement can reduce output cancellation of the heating/cooling function and output cancellation of the humidifying/dehumidifying function. Consequently, it is possible to realize control close to minimum output for the temperature/humidity control system as a whole, and achieve energy saving. Also, the energy saving effect can be further enhanced by combining the cooling temperature controller and cooling output maximum value operation unit. As in the third embodiment, the cooling actuator can be appropriately operated even when a heating request or cooling request is generated, so high controllability can be obtained.

As has been described above, the present invention is suited to a temperature/humidity control system using a heating actuator, cooling actuator, and humidifying actuator, or to a temperature control system using a heating actuator as a main actuator and a cooling actuator as an auxiliary actuator.

What is claimed is:

1. A temperature/humidity control method characterized in that a manipulated variable output to a cooling actuator, of manipulated variable outputs to a heating actuator and the cooling actuator of a controller for controlling temperature, is compared with a manipulated variable output to the cooling actuator, of manipulated variable outputs to a humidifying actuator of a controller for controlling humidity and to the cooling actuator, and a larger manipulated variable output is given to the cooling actuator.

2. A temperature control method characterized in that a manipulated variable output from a controller for controlling heating is given as a controlled variable input to a controller for controlling cooling, and an ideal value of the manipulated variable output is given as a set point to the controller for controlling cooling.

3. A temperature/humidity control device characterized by comprising:

a heating actuator for realizing a heating function of temperature control;

a cooling actuator for realizing a cooling function of temperature control and a dehumidifying function of humidity control;

a humidifying actuator for realizing a humidifying function of humidity control;

a temperature controller for controlling temperature;

a humidity controller for controlling humidity;

a temperature control output branch unit for outputting a manipulated variable output from said temperature controller to said heating actuator if the value of this manipulated variable output corresponds to a heating mode, and outputting the manipulated variable output from said temperature controller to said cooling actuator if the value of this manipulated variable output corresponds to a cooling mode;

a humidity control output branch unit for outputting a manipulated variable output from said humidity controller to said humidifying actuator if the value of this manipulated variable output corresponds to a humidifying mode, and outputting the manipulated variable output from said humidity controller to said cooling actuator if the value of this manipulated variable output corresponds to a dehumidifying mode; and a cooling output maximum value operation unit which is placed between said temperature control output branch unit and said cooling actuator and between said humidity control output branch unit and said cooling actuator, compares the manipulated variable outputs from said temperature control output branch unit and humidity control output branch unit, and gives a larger manipulated variable output to said cooling actuator.

4. A temperature/humidity control device characterized by comprising:

a heating actuator for realizing a heating function of temperature control;

a cooling actuator for realizing a cooling function of temperature control and a dehumidifying function of humidity control;

a humidifying actuator for realizing a humidifying function of humidity control;

a heating temperature controller for controlling heating and giving a manipulated variable output to said heating actuator;

a cooling temperature controller for controlling cooling and giving a manipulated variable output to said cooling actuator;

a humidifying humidity controller for controlling humidifying and giving a manipulated variable output to said humidifying actuator;

a dehumidifying humidity controller for controlling dehumidification and giving a manipulated variable output to said cooling actuator;

a temperature controller switching unit for operating said heating temperature controller in a heating mode, and operating said cooling temperature controller in a cooling mode;

a humidity controller switching unit for operating said humidifying humidity controller in a humidifying mode, and operating said dehumidifying humidity controller in a dehumidifying mode; and a cooling output maximum value operation unit which is placed between said cooling temperature controller and said cooling actuator and between said dehumidifying humidity controller and said cooling actuator, compares the manipulated variable outputs from said cooling temperature controller and dehumidifying humidity controller, and gives a larger manipulated variable output to said cooling actuator.

5. A temperature control device characterized by comprising:

a heating actuator for realizing a heating function of temperature control;

a cooling actuator for realizing a cooling function of temperature control;

a heating temperature controller for controlling heating and giving a manipulated variable output to said heating actuator; and a cooling temperature controller which receives the manipulated variable output from said heating temperature controller as a controlled variable input, performs an operation by using an ideal value of the manipulated variable output as a set point, and outputs a manipulated variable output as a result of the operation to said cooling actuator.

6. A temperature/humidity control device characterized by comprising:

a heating actuator for realizing a heating function of temperature control;

a cooling actuator for realizing a cooling function of temperature control and a dehumidifying function of humidity control;

a humidifying actuator for realizing a humidifying function of humidity control;

a temperature controller for controlling temperature;

a humidity controller for controlling humidity;

a temperature control output branch unit for outputting a manipulated variable output from said temperature controller to said heating actuator if the value of this manipulated variable output corresponds to a heating mode, and outputting the manipulated variable output from said temperature controller to said cooling actuator if the value of this manipulated variable output corresponds to a cooling mode;

a humidity control output branch unit for outputting a manipulated variable output from said humidity controller to said humidifying actuator if the value of this manipulated variable output corresponds to a humidifying mode, and outputting the manipulated variable output from said humidity controller to said cooling actuator if the value of this manipulated variable output corresponds to a dehumidifying mode;

a cooling temperature controller which receives the manipulated variable output from said temperature control output branch unit as a controlled variable input, performs an operation by using an ideal value of the manipulated variable output as a set point, and outputs a manipulated variable output as a result of the operation to said cooling actuator; and a cooling output maximum value operation unit which is placed between said cooling actuator and said temperature control output branch unit, humidity control output branch unit, and cooling temperature controller, compares the manipulated variable outputs from said temperature control output branch unit, humidity control output branch unit, and cooling temperature controller, and gives a larger manipulated variable output to said cooling actuator.

* * * * *